US009553488B2

(12) United States Patent
Schmid et al.

(10) Patent No.: US 9,553,488 B2
(45) Date of Patent: Jan. 24, 2017

(54) ELECTRICAL MACHINE, PARTICULARLY A PERMANENT MAGNET MOTOR, AND A METHOD TO PROVIDE THE ELECTRICAL WINDINGS THEREOF

(71) Applicant: NIDEC Motors & Actuators (Germany), Bietigheim-Bissingen (DE)

(72) Inventors: Juergen Schmid, Lauffen (DE); Juergen Mezger, Ludwigsburg (DE)

(73) Assignee: NIDEC MOTORS & ACTUATORS (Germany), Bietigheim-Bissingen (DE)

( * ) Notice: Subject to any disclaimer, the term of this patent is extended or adjusted under 35 U.S.C. 154(b) by 461 days.

(21) Appl. No.: 14/052,851

(22) Filed: Oct. 14, 2013

(65) Prior Publication Data

US 2014/0103775 A1 Apr. 17, 2014

(30) Foreign Application Priority Data

Oct. 12, 2012 (DE) .................. 10 2012 020 109

(51) Int. Cl.
| | |
|---|---|
| H02K 3/28 | (2006.01) |
| H02K 23/30 | (2006.01) |
| H02K 23/32 | (2006.01) |
| H02K 15/09 | (2006.01) |
| H02K 15/04 | (2006.01) |

(52) U.S. Cl.
CPC ............ *H02K 3/28* (2013.01); *H02K 15/0442* (2013.01); *H02K 15/09* (2013.01); *H02K 23/30* (2013.01); *H02K 23/32* (2013.01); *Y10T 29/49071* (2015.01)

(58) Field of Classification Search
CPC ........ H02K 23/04; H02K 23/20; H02K 23/26; H02K 23/38; H02K 3/28; H02K 3/32; H02K 23/30; H02K 15/0442; H02K 15/09

USPC .......................... 310/179, 180, 198
See application file for complete search history.

(56) References Cited

U.S. PATENT DOCUMENTS

| | | | | |
|---|---|---|---|---|
| 7,348,705 B2* | 3/2008 | Cai | .......... | H02K 3/28 310/184 |
| 7,619,344 B2* | 11/2009 | Osawa | .......... | H02K 23/28 310/198 |
| 7,825,561 B2* | 11/2010 | Nashiki | .......... | H02K 1/08 310/179 |

(Continued)

FOREIGN PATENT DOCUMENTS

| | | |
|---|---|---|
| DE | 32 029 58 A1 | 8/1983 |
| DE | 100 56 794 A1 | 5/2002 |

(Continued)

OTHER PUBLICATIONS

H. Sequenz, "Die Wicklungen elektrischer Maschinen," 1950.

*Primary Examiner* — Tran Nguyen
(74) *Attorney, Agent, or Firm* — 24IP Law Group; Timothy R DeWitt

(57) ABSTRACT

An electrical machine, particularly a permanent magnet motor, having a number of poles and teeth or tooth groups that is divisible by a whole number A around which coil-forming loops of winding wire are arranged such that B coils are arranged in series, the coils having a number of windings equivalent to C/B where C is a whole number divisor of B and indicates the wire diameter as a quotient of a traditional standard winding, as well as a method to provide a corresponding winding structure.

11 Claims, 6 Drawing Sheets

(56) References Cited

U.S. PATENT DOCUMENTS

2011/0095638 A1* 4/2011 Sakata .................. H02K 23/20
310/179

FOREIGN PATENT DOCUMENTS

| DE | 10 2007 026 674 A | 12/2008 |
|----|-------------------|---------|
| DE | 10 2011 003 049 A | 7/2012 |
| EP | 1 578 000 A1 | 9/2005 |
| EP | 2302769 | 3/2011 |
| JP | 2006101598 | 4/2006 |
| JP | 2006325993 | 12/2006 |
| WO | 2012101961 | 1/2012 |

* cited by examiner

- 2-layer for manual/needle-winding -

- 2-layer for flyer -

- 2-layer for flyer -

ELECTRICAL MACHINE, PARTICULARLY A PERMANENT MAGNET MOTOR, AND A METHOD TO PROVIDE THE ELECTRICAL WINDINGS THEREOF

CROSS-REFERENCE TO RELATED APPLICATIONS

The present application claims priority to and the benefit of the filing date of German Patent Application No. DE 10 2012 020 109.5 filed by the present inventors on Oct. 12, 2012.

BACKGROUND OF THE INVENTION

1. Field of the Invention

The present invention concerns, in general, electrical machines, such as a permanent magnet motor, as well as a method for forming the windings contained therein.

2. Brief Description of the Related Art

Electrical machines are generally known and are used for various purposes and applications; they can, for example, be designed as 'brush' motors or 'brushless' motors, such as commonly used in motor vehicle applications, for example. For example, these types of motors include motors to adjust seats as well as drive motors used to rotate pumps or fan elements. Such electrical machines contain a stator and a rotor having magnetic poles. In this case, the stator is provided with windings, usually made of copper wire, which when wired accordingly generate a fluctuating electromagnetic field for the purpose of driving the rotor. The electrical machine can also be a generator.

The continually increasing requirements in relation to minimal weight and for attaining a small internal volume, while retaining or even increasing the power density and capacity, remain an ongoing challenge in efforts to improve such electrical machines. To design the manufacturing process as efficiently as possible, various winding methods have been devised; one skilled in the art would be familiar with, in particular, the so-called linear winding technique, the so-called flyer winding technique, the so-called needle winding technique, and the so-called ring core winding technique. When manufacturing large numbers of electrical machines, such as for automotive applications, usually either the needle winding technique or the flyer winding technique is used. A double winding on the rotor has been attempted in relation to both the so-called needle winding technique and flyer winding technique in order to reduce the length of the winding overhang. For this special application, wire with an accordingly reduced diameter was wound twice according to the traditional winding scheme, which considerably extended the manufacturing process while also rendering aspects relating to connection more complicated due to the increased number of connection wires requiring connection to their respective commutator hooks.

An example of a winding procedure is disclosed in WO 2012101961. Furthermore, another procedure as well as a corresponding electrical machine are known from DE 102011003049. This document details attempts to achieve the greatest possible degree of filling and therefore also to make the needle space itself useful, which is achieved by winding the wire in a figure eight shape.

Accordingly, the problem of the present invention is to provide an electrical machine in which at least one element is optimized among the requirements for internal volume, capacity or weight, while simultaneously keeping the other parameters the same.

Another task of the invention is to provide methods capable of providing the windings for such an improved electrical machine.

SUMMARY OF THE INVENTION

Pursuant to the invention the above problems are solved by the features of the independent device claims and independent method claims.

In particular, the invention proposes an electrical machine, which can be a permanent magnet motor, for example. The electrical machine is provided having a number of poles and teeth or tooth groups on which loops of wire forming a coil are arranged, the number of said loops being divisible by a whole number A. The loops forming a coil are arranged such that B coils are wrapped or wound in series, i.e. are arranged in series with a number of windings equivalent to C/B. In this case C represents a whole number divisor of B and indicates the wire diameter as a quotient of the traditional standard winding. In a particularly preferred embodiment, a wire diameter is used as for a standard winding such that C=1. In a particularly simple embodiment, B=2.

Therefore, pursuant to the invention an electrical machine is provided in which the height of the winding overhang is reduced by winding wire around multiple tooth groups in series, for example, two tooth groups each with a proportional winding number, for example, half of the usual winding number, while retaining the same wire diameter as for a single winding, for example. The number of turns or windings relevant for the electromagnetic design remains the same since the number of coils having a correspondingly divided number of windings are wrapped or wound around tooth groups until a corresponding number of total windings is reached once again, although this is now provided in two or more partial coils. Overall this results in an overhang that is wider, yet not as high.

An additional advantage of the proposed solution is that the number of winding wires beneath the commutator hook does not increase, such that arranging the electrical contacts is simplified compared to conventional double windings, which in turn improves product quality and can reduce the reject rate in production processes.

In a preferred embodiment the coils arranged in series run in the same direction, particularly using the needle winding technique. This sort of design enables each of the resulting partial windings to be especially homogeneous, which ensures high production efficiency.

It is advantageous for at least the coils arranged in series which are proximate to the connection point to be designed such that they have rotational symmetry with respect to one another. In the simplest example of two coils connected in series, the two coils have rotational symmetry with respect to one another, which in all cases results in dramatic avoidance of disturbing impedance and enables especially simple wiring as the windings proximate to the connection point are quite similar in shape to one another and therefore exhibit comparable characteristics and electromagnetic properties.

In a particularly preferred embodiment, the coils arranged in series are spaced by an odd number of poles or teeth and/or tooth groups. For example, it is possible for two coils to be spaced by a pole and/or tooth group such that in practice every wiring connection forms a bridge over a pole, where each of the bridge ends is formed by one coil winding and the entirety of partial coil windings provides a [single] coil winding associated with the pole.

In an alternative preferred embodiment, the coils arranged in series are formed by loops running in opposite directions from coil to coil and for which the flyer winding technique in particular is used. Use of the flyer winding technique, also called the flyer technique for short, and therefore the arrangement of coils in opposite directions, allows very small path lengths to be used during winding; this however renders incomplete the homogeneity between the two or more coils wrapped or wound in series, which are later to be connected. In a particularly simple embodiment having two coils that are immediately adjacent to each other and which are connected in series, for example, the number of windings in the second tooth group is slightly different from that of the first tooth group. This difference in the number of windings can be equalized, however, by correspondingly offsetting the following coil set that is wrapped or wound in series with correspondingly reversed connection to contacts, if desired or necessary.

It is advantageous in this design that the coils arranged in series not be spaced and/or adjacent or spaced by an even number of poles. On account of the fact that the coils run in opposite directions, the entire pole geometry and/or winding geometry can be provided particularly simply and efficiently, while in all cases the advantage of low path distances can still be ensured.

In a particularly preferred embodiment, the connection wires contact the commutator hooks at essentially the same angles in order to avoid disturbing impedance and to provide the most symmetrical overall structure possible.

Alternatively, particularly when the partial coils are arranged in opposite directions, the various connection wires are arranged in the same angle quadrants. This allows the connection lines to be laid virtually in parallel and also facilitates identification of the incoming and outgoing lines to the sets of partial coils wrapped or wound in series.

Furthermore, the invention also concerns a method to form windings for an electrical machine using the needle winding technique, the method comprising:

winding in a first direction a number of coil-forming loops around a first tooth group;

leading the coil-forming wire around an odd number of tooth groups so as to bypass them;

winding in the same direction a predetermined number of coil-forming loops around a tooth group;

optionally, repeating one or more times the previous two steps;

repeating the aforementioned steps, beginning with the tooth group following the first tooth group wrapped or provided with windings in the previous step until a uniform coil configuration is obtained on at least all tooth groups;

connecting to each of the resulting partial coils, which together form a serial coil connection, by means of corresponding commutator hooks.

When the well-known needle winding technology is used, the method therefore enables electrical machines to be manufactured especially efficiently, the core of the invention consisting in winding wire around multiple tooth groups in series in partial coils as many times as indicated by a divisor of the number of coil-forming loops.

In an alternative proposed method using the flyer winding technique, a proportionally reduced number of coil-forming loops are wrapped or wound in series around teeth or tooth groups that are adjacent or spaced by an even number of tooth groups. In particular, this method comprises the following steps:

Winding a predetermined number of coil-forming loops of wire around a first tooth group;

winding in the opposite direction a predetermined number of coil-forming loops, plus a three-quarters winding, around an adjacent tooth group or a tooth group spaced by an even number of teeth or tooth groups;

if desired, repeating the wrapping of an additional tooth group until a number of partial windings formed in series is obtained that is a potential divisor of the total number of poles;

repeating the above method steps, beginning with the tooth group following the first tooth group which was previously wrapped or provided with windings until an entirely uniform winding is obtained. Next, the commutator hooks are connected such that the ends of a serial arrangement of partial coils that have been wrapped or wound in series are connected to corresponding commutator hooks. The alternative method pursuant to the invention allows for especially cost-effective and performance-effective windings, each formed from partial windings connected in series.

In summary, by using serial winding, the invention allows an improved arrangement that can be manufactured at reduced cost and in less time. In an especially simple exemplary embodiment, which is described below in detail, having four poles, for example, each of the four required coils can be provided by two partial coils each associated with a pair of partial coils that are connected in series and wrapped or wound in series, respectively. Although an especially simple example is used in the following description of preferred embodiments, one skilled in the art will recognise that configurations corresponding to four poles are possible if a greater number of poles are provided. For example with regard to a six-pole electrical machine, serial winding in pairs or triplets could be provided, each having half the number of windings per partial coil or one-third the number of windings per partial coil if the diameter of the winding wire is to remain unchanged. It will be evident to one skilled in the art that when the winding wire diameter is reduced, the number of windings in the partial coil would have to be multiplied accordingly by a multiplier. For example, in the example of a four-pole arrangement, each pair of partial coils can be provided with a number of windings corresponding to a standard winding, however with half the diameter such that the overall coil package formed by two half partial coils of the coil pair wrapped or wound in series can produce a corresponding electromagnetic effect. Furthermore, one skilled in the art will also recognize that individual features of a preferred embodiment can be combined as desired with the features of other embodiments and that the following description of preferred embodiments is provided solely as an example and is not intended to limit the scope of the claims.

DETAILED DESCRIPTION OF THE PREFERRED EMBODIMENTS

Figure 1:
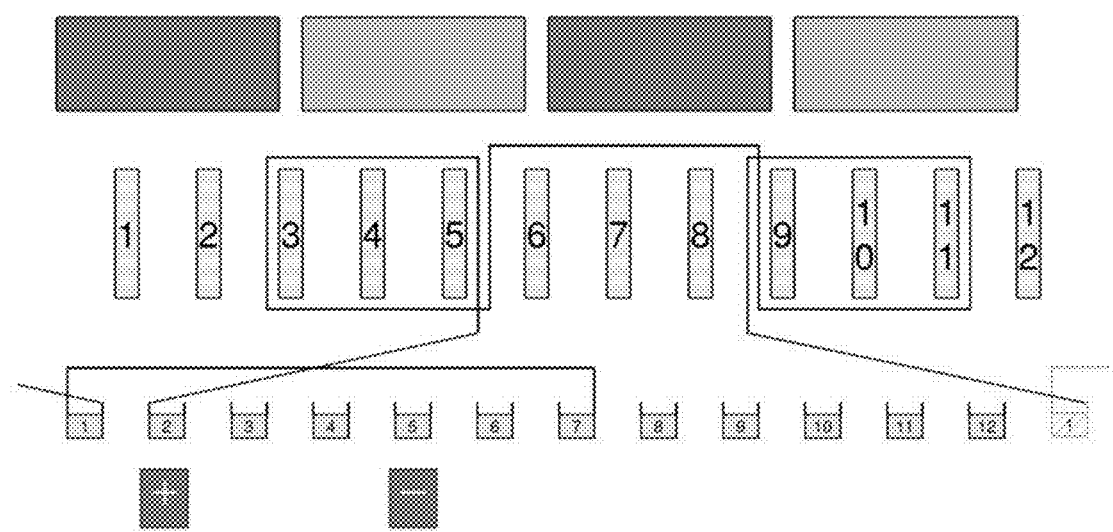
FIG. 1 shows a schematic representation of a winding scheme to explain a first preferred embodiment of the invention.

A first embodiment of the invention is described below with reference to FIG. 1. In particular, it relates to an electrical machine, namely a permanent magnet motor having a number of four magnetic poles where twelve teeth are arranged accordingly on the rotor, said teeth being arranged in four tooth or teeth groups consisting of three teeth each. The teeth are represented in the figure by rectangular boxes numbered 1 to 12.

Starting from the second commutator hook, the winding wire is lead to the gap between teeth 5 and 6 and, in the example shown, windings are provided in a clockwise direction around the tooth group consisting of teeth 3, 4 and 5 according to a predetermined number of coil-forming loops. In the present example, the number of coil-forming loops is determined to be half of the number of coil windings usually used to obtain the desired electromagnetic effect, where in the illustrated example, the wire diameter chosen corresponds to a traditional winding. On the side opposite the commutator hook, the winding wire is then lead to bypass a tooth group again consisting of three teeth and is wrapped or wound in series, again in a clockwise direction in the embodiment shown here, around the tooth group composed of teeth 9, 10 and 11, again according to a predetermined number of coil-forming windings. As for the first partial coil, in the exemplary embodiment chosen here, the wire is again wrapped or wound around the second tooth group half the number of times, then the connection wire passes back through the gap between teeth 8 and 9 in order to contact commutator hook number 1. With regard to the other tooth groups, the illustrated winding scheme as described above is repeated accordingly twelve times such that every tooth group receives two partial coils, each of which is associated with different series connections, but which are connected equally and/or in phase. This results in an overall winding structure that is designed electromagnetically like a conventional structure, however the winding in series allows reduced height without the need for additional connections which would usually be associated with double winding. On the contrary, product quality can be improved and rejection rates are reduced in production lines, which is an advantage.

An alternative embodiment is explained below with reference to FIG. 2. The embodiment described here is again a four-pole arrangement for an electrical machine. For the embodiment shown here, it is advantageous to use the flyer winding technique. As for the first embodiment described, multiple partial coils are wrapped or wound in series according to a proportional number of windings; however, sequential or following partial windings are performed in opposite directions. In the exemplary embodiment shown here, the first winding is therefore performed around the tooth group consisting of teeth 3, 4, 5 in a clockwise direction; the winding wire is then lead to or through the gap between teeth 5 and 6 to the side facing away from the commutator hook, then it is lead around teeth 6, 7 and 8 so as to bypass them, and then lead to the side facing the commutator hook, from which point the winding is continued around the tooth group consisting of teeth 6, 7 and 8 in a counter-clockwise direction up to a predetermined number of coil-forming loops according to, for example, the relevant divisor. In the example illustrated here, the divisor is specified as "two", which results in a number of windings that is half the number of that used in a traditional design. As described above, twelve sequential windings are once again performed in series such that a first partial coil and a second partial coil are arranged so as to overlap. Overall, a uniform coil package such as this results in each case from two partial coils, where each pair is uniform overall compared to the pair adjacent to it and where every adjacent coil package is connected such that an overall desired electromagnetic effect is achieved. Again, the number of windings is kept constant and when two coils with half the number of windings and the same wire diameter are wound or wrapped around a coil group, the resulting winding overhang is wider and not as high.

In the two embodiments described above, the partial coils are connected at essentially corresponding angles with respect to the commutator hooks, such that overall a high degree of symmetry is retained and wiring essentially corresponds to classic wiring, however one in which the commutator hooks are arranged accordingly in sets. In the example shown, each set consists of two partial coils wrapped or wound in series and connected in series.

Figure 2:
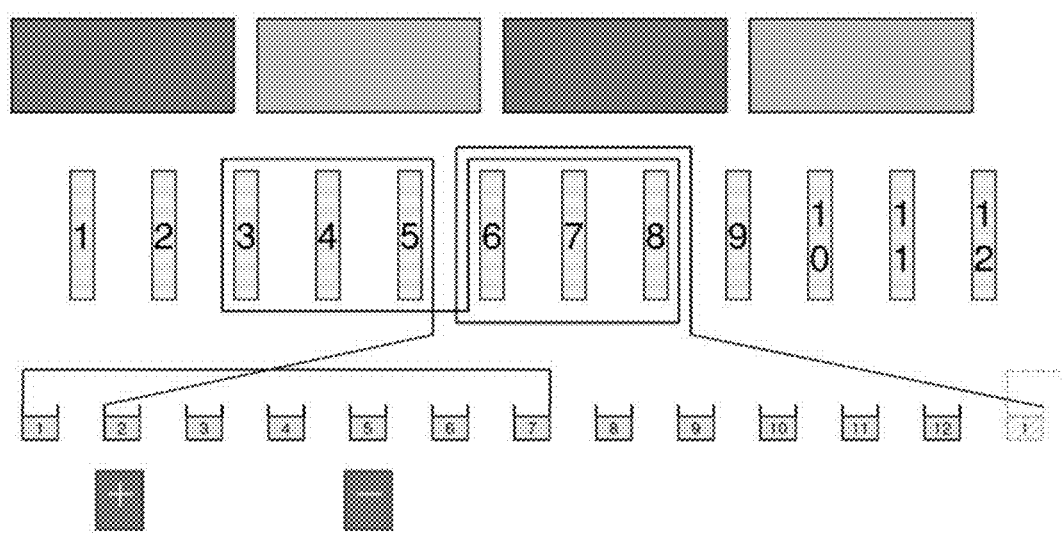
FIG. 2 shows an alternative winding scheme to explain a second preferred embodiment of the invention.
Figure 3:
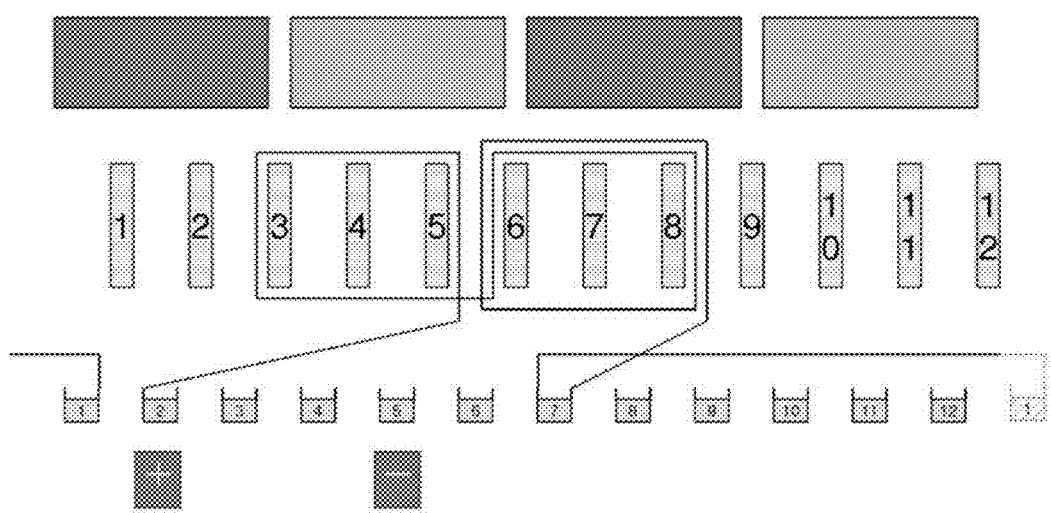
FIG. 3 shows a variant of the embodiment shown in FIG. 2, with alternative wiring.

In the embodiment variant shown in FIG. 3, essentially the winding scheme from FIG. 2 is employed, but an alternative contact connection is used. This alternative contact connection is especially advantageous because the coil sets, each of which being composed of partial coils, are assigned to corresponding commutator hooks.

The corresponding winding processes are again described below. The complete winding process is shown in the corresponding figures.

Figure 4:
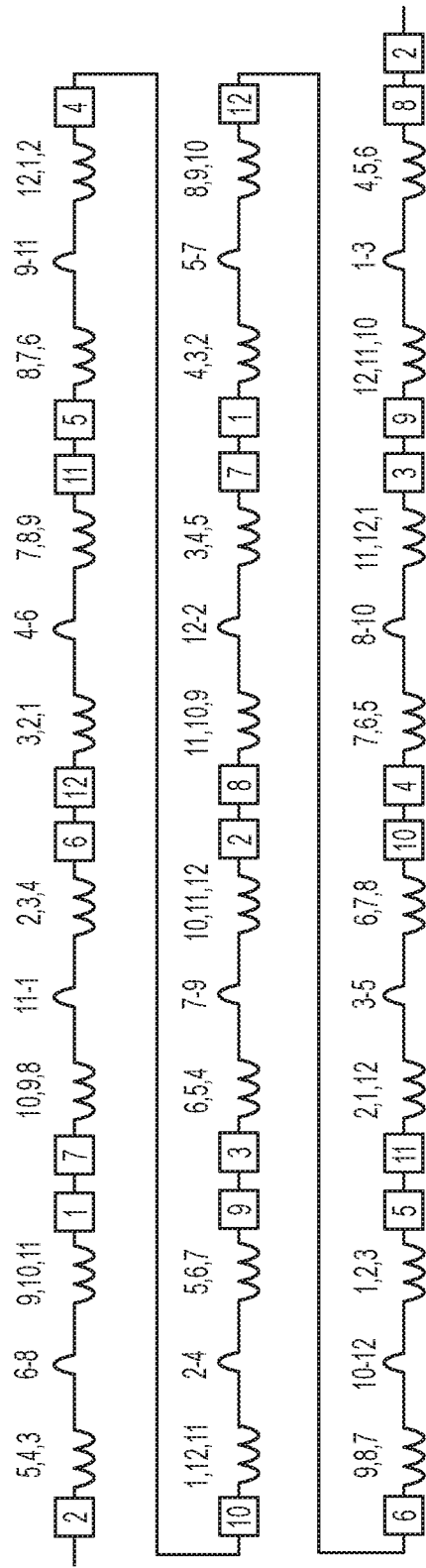
FIG. 4 shows, for an improved overview, a winding scheme represented in FIG. 1 as the rotor winding. The winding pattern as illustrated in FIG. 4 is corresponding to a completely wound armature. The illustration shows for each group of teeth two coils to be wound. Here, the winding 5, 4, 3 for coil 1 is corresponding to winding 3, 4, 5 for coil 2, respectively.

FIG. 4 shows the winding scheme already represented in FIG. 1 as the rotor winding, which however was not illustrated completely in the interest of providing a better overview. The lacquered wire is laid in a loop around commutator hook 2 using a needle winder, is then wound multiple times in a counter-clockwise direction to the coil formation up to a defined number of windings around the tooth group composed of teeth 5, 4 and 3, and then, after wiring over the tooth group composed of teeth 6, 7 and 8, is wound in the same direction around the tooth group composed of teeth 9, 10 and 11 up to the same number of windings.

Next, the contact connection is made by way of placing a loop around commutator hook 1 and subsequent wiring to commutator hook 7. Winding after commutator hook 7 then proceeds according to the previously described sequence, with the coil being wrapped or wound in a counter-clockwise direction around the tooth group composed of teeth 10, 9 and 8, etc. It is evident that when this sequence is followed, the two partial coils, e.g. those on the tooth group composed of teeth 9, 10 and 11, do not lie directly on top of one another, which results in the positive effect described above of reducing the winding overhang. It is also evident that twelve coils are created in groups of two coils each, which are connected in series. Wiring to the commutator hooks results in parallel current flow in 4 sub-branches with 6 coils connected in series in each case.

Figure 5:
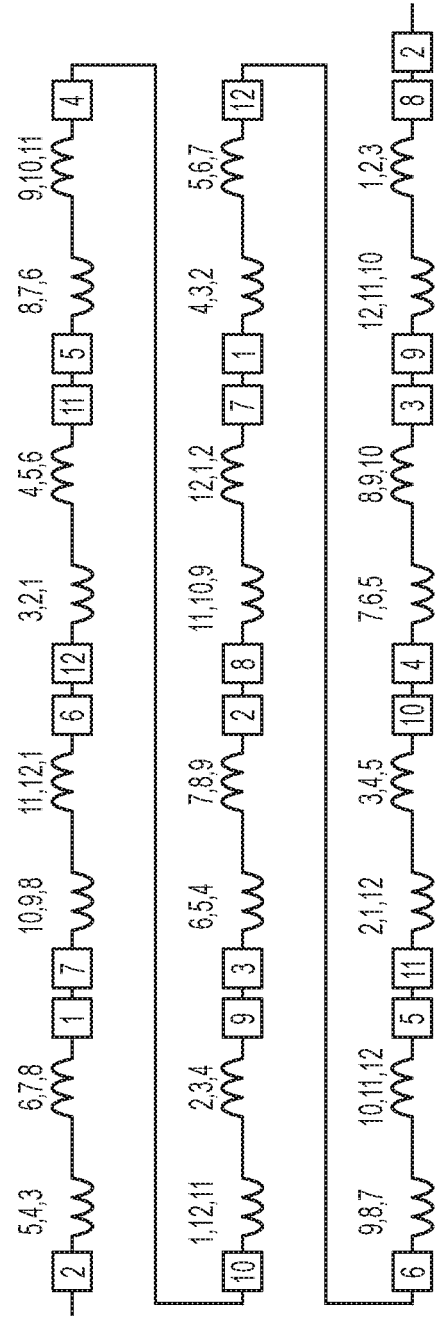
FIG. 5 shows a winding scheme represented in FIG. 2 as the rotor winding.

The rotor winding in FIG. 2 is the basis for the winding scheme pursuant to FIG. 5. The lacquered wire is laid in a loop around commutator hook 2 using a flyer winding machine, is then wrapped or wound in a counter-clockwise direction to form a coil multiple times around the tooth group composed of teeth 5, 4 and 3 up to a defined number of windings; the rotor is then rotated further by 3 teeth in the direction of winding and the wire is wrapped around the tooth group composed of teeth 6, 7 and 8 in a clockwise direction. It must be ensured that the number of windings differs from the defined number of windings by one three-quarter winding. The contact connection is then implemented by way of a loop around commutator hook 1 and subsequent wiring to commutator hook 7. Winding after commutator hook 7 then proceeds according to the sequence described above insofar as a coil is wrapped in a counter-clockwise direction around the tooth group composed of teeth 10, 9 and 8, etc. It is evident that because of this sequence the two partial coils, e.g. on the tooth group composed of teeth 9, 10 and 11, do not lie directly on top of one another.

Figure 6:
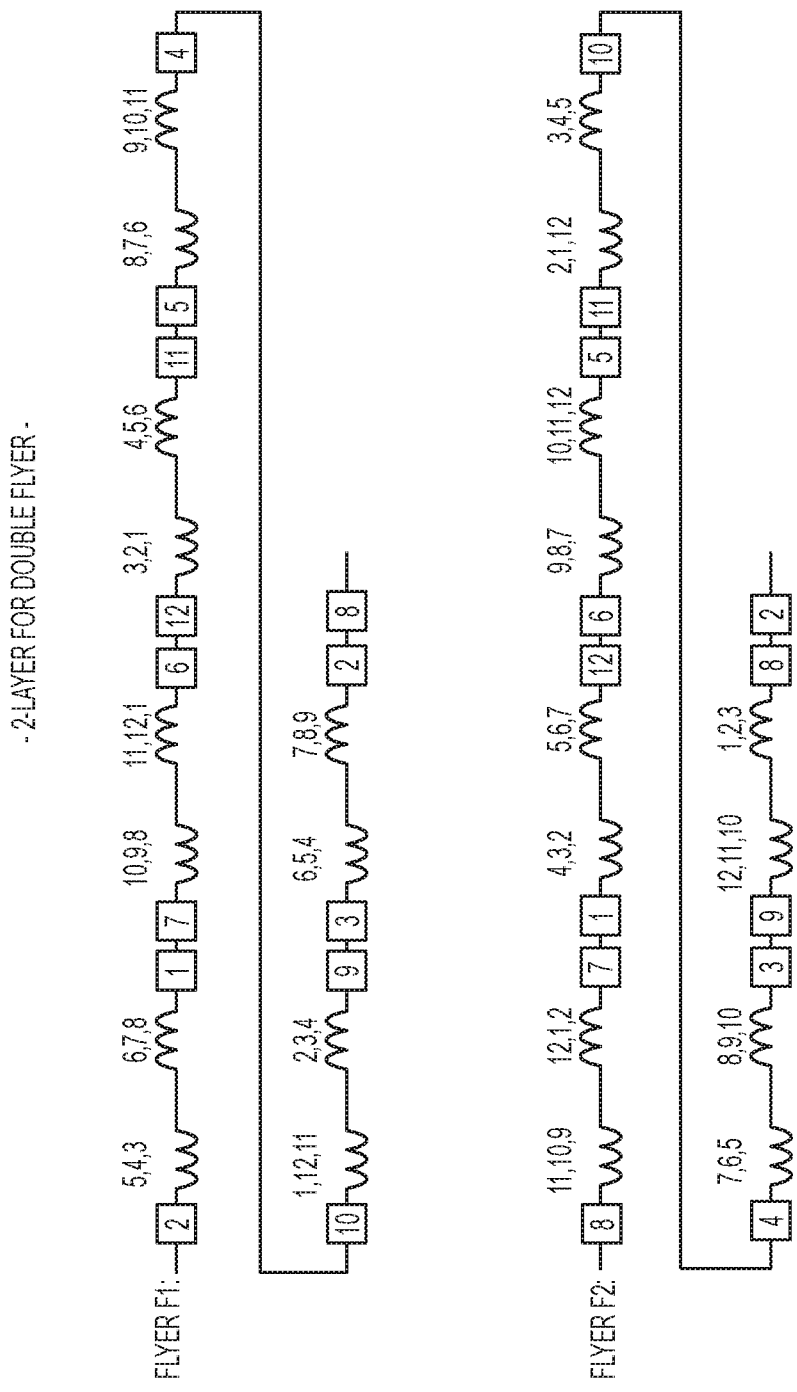
FIG. 6 shows an alternative winding scheme that is in conformity and also similar to the rotor winding shown in FIG. 2.

The rotor winding in FIG. 2 is also used as the basis for the winding scheme pursuant to FIG. 6. In this case, however, the winding is illustrated as performed using a double flyer winding setup.

Flyers F1 and F2 run synchronously in the same direction and lay wire around coils that are diametrically opposed.

Flyer F1 is used to lay the lacquered wire in a loop around commutator hook 2, then to wrap the wire multiple times to form a coil around the tooth group composed of teeth 5, 4 and 3 up to a defined number of windings; the rotor is rotated further by three teeth in the direction of winding and the wire is wrapped around the tooth group composed of teeth 6, 7 and 8 in a clockwise direction. It must be ensured that the number of windings differs from the defined number of windings by one three-quarter winding. The contact connection is then implemented by way of a loop around commutator hook 1 and subsequent wiring to commutator hook 7. Winding after commutator hook 7 then proceeds according to the sequence described above insofar as a coil is wrapped in a counter-clockwise direction around the tooth group composed of teeth 10, 9 and 8, etc.

Simultaneously while Flyer F1 is carrying out its process, Flyer F2 is used to lay the lacquered wire in a loop around commutator hook 8, then to wrap the wire in a counter-clockwise direction multiple times to form a coil around the tooth group composed of teeth 11, 10 and 9 up to a defined number of windings; the rotor is rotated further by 3 teeth in the direction of winding, and the wire is wrapped around the tooth group composed of teeth 12, 1 and 2 in a clockwise direction. The number of windings also differs from the defined number of windings by one three-quarters winding. The contact connection is then implemented by way of a loop around commutator hook 7 and subsequent wiring to commutator hook 1. Winding after commutator hook 1 then proceeds in accordance with the sequence described above insofar as a coil is wrapped in a counter-clockwise direction around the tooth group composed of teeth 4, 3 and 2, etc. It is also evident in the case of double flyer winding that this process results in the two partial coils not lying directly on top of one another, e.g. those around the tooth group composed of teeth 9, 10 and 11.

A more advanced design could, for example, combine various serial windings with one another where both varying wire diameters and varying serial arrangements in varying numbers could be used. In particular, it is sufficient for the invention if at least two tooth groups are wrapped or wound in series.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. An electrical machine comprising,
a permanent magnet motor comprising:
a plurality of poles and teeth or tooth groups around which coil-forming loops of winding wire having a wire diameter X are arranged such that B coils are arranged in series;
wherein said permanent magnet motor produces the same electromagnetic effect as a permanent magnet motor having a rotor with Z windings of winding wire having a diameter Y, and
wherein each of the B coils has a number of windings equivalent to (C/B)Z where C is a whole number divisor of B and is equal to Y/X.

2. The electrical machine according to claim 1, wherein the coils arranged in series are laid in the same direction, by using a needle winding machine.

3. The electrical machine according to claim 2, wherein at least the connection-proximate coils arranged in series show rotational symmetry.

4. The electrical machine according to claim 2, wherein the coils arranged in series are spaced by an odd number of poles.

5. The electrical machine according to claim 3, wherein the coils arranged in series are spaced by an odd number of poles.

6. The electrical machine according to claim 1, wherein the coils arranged in series are laid in opposite directions, by using flyer winding technology.

7. The electrical machine according to claim 6, wherein the coils arranged in series are not spaced by any poles or are spaced by an even number of poles.

8. The electrical machine according to claim 1, wherein the connection wires substantially form the same angle.

9. The electrical machine according to claim 3, wherein the connection wires all run in one and the same angle quadrant.

10. The electrical machine according to claim 4, wherein the connection wires all run in one and the same angle quadrant.

11. The electrical machine according to claim 5, wherein the connection wires all run in one and the same angle quadrant.

* * * * *